United States Patent
Ito (10) Patent No.: US 7,949,607 B2
(45) Date of Patent: May 24, 2011

(54) IMAGE FORMING APPARATUS, LICENSE MANAGING METHOD FOR APPLICATIONS EXECUTED BY IMAGE FORMING APPARATUS, PROGRAM FOR IMPLEMENTING THE METHOD, AND STORAGE MEDIUM STORING THE PROGRAM

(75) Inventor: Daisuke Ito, Kawasaki (JP)

(73) Assignee: Canon Kabushiki Kaisha (JP)

( * ) Notice: Subject to any disclaimer, the term of this patent is extended or adjusted under 35 U.S.C. 154(b) by 794 days.

(21) Appl. No.: 11/157,686

(22) Filed: Jun. 21, 2005

(65) Prior Publication Data

US 2006/0021012 A1    Jan. 26, 2006

(30) Foreign Application Priority Data

Jun. 21, 2004 (JP) ................. 2004-182448
Feb. 8, 2005 (JP) ................. 2005-031956
Jun. 9, 2005 (JP) ................. 2005-169585

(51) Int. Cl.
G06F 21/00 (2006.01)

(52) U.S. Cl. .......... 705/59; 705/1; 705/51; 705/64; 713/176; 713/189; 713/200; 713/201; 726/26; 726/30; 380/232

(58) Field of Classification Search .......... 705/59, 705/51, 1, 64; 713/176, 189, 200, 201; 726/26, 726/30; 380/232
See application file for complete search history.

(56) References Cited

U.S. PATENT DOCUMENTS

| | | | |
|---|---|---|---|
| 6,226,618 B1* | 5/2001 | Downs et al. ............ | 705/1 |
| 7,062,468 B2* | 6/2006 | Hillegass et al. .......... | 705/59 |
| 7,065,507 B2* | 6/2006 | Mohammed et al. ......... | 705/59 |
| 7,110,982 B2* | 9/2006 | Feldman et al. .......... | 705/51 |
| 7,124,302 B2* | 10/2006 | Ginter et al. ............ | 713/189 |
| 7,171,662 B1* | 1/2007 | Misra et al. ............. | 717/177 |
| 7,213,005 B2* | 5/2007 | Mourad et al. ........... | 705/64 |
| 7,228,567 B2* | 6/2007 | Serkowski et al. ........ | 726/30 |
| 7,231,669 B2* | 6/2007 | Leung et al. ............ | 726/26 |
| 7,376,626 B2* | 5/2008 | Nagai et al. ............ | 705/57 |
| 2002/0019814 A1* | 2/2002 | Ganesan ................. | 705/59 |
| 2002/0085720 A1 | 7/2002 | Okada et al. | |
| 2002/0114466 A1* | 8/2002 | Tanaka et al. ........... | 380/232 |

(Continued)

FOREIGN PATENT DOCUMENTS

JP    5-197542 A    8/1993

(Continued)

OTHER PUBLICATIONS

Office Action, mailed Nov. 7, 2008, issued in corresponding JP2005-169585. English abstract provided.

(Continued)

*Primary Examiner* — Pierre Eddy Elisca
*Assistant Examiner* — Shahid Kamal
(74) *Attorney, Agent, or Firm* — Rossi, Kimms & McDowell LLP (57) ABSTRACT

An image forming apparatus which enables a user to continue an operation using an application without restarting the application, by the image automatically accessing a license server to update a license for the application when the license becomes expired while the user is performing the operation. A notification notifying the application of invalidity of the license is issued when it is detected that the license for the application has become invalid during execution of the application. The application suspends the execution of the application in response to the notification.

13 Claims, 8 Drawing Sheets

U.S. PATENT DOCUMENTS

| | | | |
|---|---|---|---|
| 2002/0120579 A1 | 8/2002 | Kawaguchi et al. | |
| 2003/0187801 A1* | 10/2003 | Chase et al. | 705/59 |
| 2003/0217011 A1* | 11/2003 | Peinado et al. | 705/59 |
| 2004/0117784 A1 | 6/2004 | Endoh | |

FOREIGN PATENT DOCUMENTS

| | | | |
|---|---|---|---|
| JP | 2001-092779 A | 4/2001 |
| JP | 2002-144678 A | 5/2002 |
| JP | 2002-169620 A | 6/2002 |
| JP | 2002-259606 A | 9/2002 |
| JP | 2004-038247 A | 2/2004 |
| JP | 2004-133501 A | 4/2004 |
| JP | 2004-139148 A | 5/2004 |

OTHER PUBLICATIONS

Decision of Rejection issued in corresponding Japanese Patent application No. 2005-169585 dated Mar. 14, 2009.

Office Action issued in corresponding Japanese Patent Application No. 2005-169585 dated Feb. 1, 2011.

Kawahara, Masaji. "Superdistribution for Electronic Objects," The Institute of Electronics, Information, and Communication Engineers, Sep. 21, 1994, pp. 17-24. Cited in O.A. issued in corresponding Japanese Patent Application No. 2005-169585 dated Feb. 1, 2011. See NPL cite No. 1. Full English translation provided.

Torii, Naoya et al., "System Architecture for Superdistriubution," The Institute of Electronics, Information, and Communication Engineers, Sep. 21, 1994, pp. 59-66. Cited in O.A. issued in corresponding Japanese Patent Application No. 2005-169585 dated Feb. 1, 2011. See NPL cite No. 1. Full English Translation provided.

Tamura, Nao. "Renewal/Expiration/Update Net Alert Screen," Countermeasure Manual, Jun. 23, 2003, pp. 166-173. Cited in O.A. issued in corresponding Japanese Patent Application No. 2005-169585 dated Feb. 1, 2011. See NPL cite No. 1. Full English Translation provided.

* cited by examiner

IMAGE FORMING APPARATUS, LICENSE MANAGING METHOD FOR APPLICATIONS EXECUTED BY IMAGE FORMING APPARATUS, PROGRAM FOR IMPLEMENTING THE METHOD, AND STORAGE MEDIUM STORING THE PROGRAM

BACKGROUND OF THE INVENTION

1. Field of the Invention

The present invention relates to an image forming apparatus, a license managing method for applications executed by an image forming apparatus, a program for implementing the method, and a storage medium storing the program.

2. Description of the Related Art

Conventionally, image forming apparatuses capable of adding and deleting functions by installing or uninstalling applications have been already known. Some of these image forming apparatuses include a function of managing a group of applications which operate on the image forming apparatuses based on respective licenses specific to the applications.

License information for managing an application, which is included in such a license, includes, for example, an application name, a version, a provider, an expiration date for use (term of use), the maximum number of times the application can be used. These pieces of license-information are generally stored in a storage device in the image forming apparatus, and are used for managing the operation of the application, as required.

As a conventional example of a platform for executing the application which is managed based on the above described license, one that first refers to license information in executing the application, and executes the application as it is if the expiration date has not been reached. Similarly, when the application is managed by the maximum number of times of use, the platform first refers to the license information, and executes the application as it is if the maximum number of times of use has not been reached.

However, when the term of use has expired or the maximum number of times of use has been reached before execution of the application or during operation of the application, normally the operation of the application is brought into a limited or inoperable state immediately thereafter. To return to a state in which the application is normally operable from this state, generally, the user performs the procedure of updating the license, obtains a new license, updates the license information held in the storage device in the image forming apparatus based on the license, and restarts the application.

A technique for avoiding intermittence of a system caused by the expiration of a license has been proposed, in which a user is prompted to update the license a fixed time period in advance of the expiration of the license by issuing a warning message indicating the remaining time period before the expiration of use of the program (for example, see Japanese Laid-Open Patent Publication (Kokai) No. H05-197542).

However, according to the above technique disclosed in Japanese Laid-Open Patent Publication (Kokai) No. H05-197542, a license may expire during operation of the application when the user gets used to a warning message issued the fixed time period in advance of the expiration of the license and postpones the operation of updating the license.

When expiration of the license occurs during operation of the application, it is necessary for the user to once terminate the execution of the application is, subsequently access an associated license server from a personal computer or the like, take the procedure of updating the license, obtain a new license, update the license information held in the storage device in the image forming apparatus based on the license, and restart the application.

The reason why it is thus necessary to take the procedure for updating the license from the personal computer or the like and obtain the new license is that there exists no appropriate or perfect means for directly accessing the external license server from the image forming apparatus and taking the procedure for updating the license to obtain a new license.

The reason why it is thus necessary to restart the application though the license information has been updated is that it is only at the time of restart of the application that the platform confirms the license information of the application, and there is no means for letting the application itself know that the license information has been updated during the operation of the application. Thus, to make it unnecessary to perform the operation of restarting the application, a method of causing the application itself to operate while periodically checking the license information can be envisaged, but with this method, the license information is not always updated immediately, leading to a very inefficient operation, and therefore this method cannot be adopted.

Under the above described situations, there still remains the problem that when the license becomes expired while the user is performing an operation using the application (for example, when the license becomes expired during copying), restart of the application is needed even if the license can be immediately updated, and the user has to perform the operation again. Obviously, this problem will become more serious in proportion to the amount and importance of the operation which the user performs.

SUMMARY OF THE INVENTION

It is an object of the present invention to provide an image forming apparatus and a license managing method for applications executed by an image forming apparatus, which enables a user to continue an operation using an application without restarting the application, by the image automatically accessing a license server to update a license for the application when the license becomes expired while the user is performing the operation, a program for implementing the method, and a storage medium storing the program.

To attain the above object, in a first aspect of the invention, there is provided an image forming apparatus comprising a license information storage unit that stores license information relating to a license for an application executed by the image forming apparatus, a license managing unit that manages the license information stored in the license information storage unit in association with the application, and a notifying unit that issues a notification notifying the application of invalidity of the license when the license managing unit detects that the license for the application has become invalid during execution of the application, wherein the application suspends the execution of the application in response to the notification from the notifying unit.

Preferably, an operation of the image forming apparatus is related to an operation of the application, and the suspension of the execution of the application in response to the notification from the notifying unit includes suspension of the operation of the image forming apparatus related to the application.

Preferably, the image forming apparatus as comprises an application managing unit that instructs a license obtaining application for accessing an external license managing device to start in response to the license managing unit detecting that the license of the application has become invalid during the execution of the application.

More preferably, the license managing unit updates the license information stored in the storage unit in response to the license obtaining application obtaining an updated license from the license managing device, and the notifying unit notifies the application that the license information has been updated.

More preferably, the application restarts the suspended execution of the application in response to the notification that the license information has been updated from the notifying unit.

Preferably the image forming apparatus further comprises a user interface that displays an operation screen of the image forming apparatus and accepts operation inputs from a user, and wherein the user interface displays a message indicating that the application is suspended in response to the suspension of the application.

More preferably, the user interface displays a massage urging update of the license of the application.

More preferably, the user interface instructs start of a license obtaining application for accessing an external license managing device in response to acceptance of a key input for license update.

More preferably, the user interface notifies the license managing unit of updated license information in response to acceptance of an input of license update information, and the license managing unit obtains the updated license information notified by the user interface to thereby update the license information stored in the storage unit.

Preferably, the image forming apparatus further comprises a user interface that displays an operation screen of the image forming apparatus and accepts operation inputs from a user, and a set value storage unit that stores setting as to whether to automatically start a license obtaining application for accessing an external license managing device when the license of the application has become invalid, and wherein the user interface is responsive to the suspension of the execution of the application, for instructing start of the license obtaining application when the setting stored in the set value storage unit is to start the license obtaining application, and for displaying a message urging update of the license when the setting stored in the set value storage unit is not to start the license obtaining application.

Preferably, the license information includes information relating to a term of validity of the application.

Preferably, the license information includes an upper limit value of a number of times of operation of the image forming apparatus which is related to the application, the image forming apparatus operating in accordance with execution of the application.

To attain the above object, in a second aspect of the invention, there is provided a license managing method for an application executed by an image forming apparatus, comprising a license information storing step of storing license information relating to a license for the application executed by the image forming apparatus, a license managing step of managing the license information stored in the license information storing step in association with the application, an application executing step of executing the application, and a notifying step of issuing a notification notifying the application of invalidity of the license when it is detected in the license managing step that the license of the application has become invalid during execution of the application, wherein the application executing step comprises suspending the execution of the application in response to the notification in the notifying step.

To attain the above object, in a third aspect of the invention, there is provided A program for implementing a license managing method for an application executed by an image forming apparatus, comprising a license information storing module for storing license information relating to the application executed by the image forming apparatus, a license managing module for managing the license information stored in the license information storing module in association with the application, an application executing module for executing the application, and a notifying module for issuing a notification notifying the application of invalidity of a license when it is detected by the license managing module that the license of the application has become invalid during execution of the application, wherein the application executing module suspends the execution of the application in response to the notification from the notifying module.

To attain the above object, in a fourth aspect of the invention, there is provided a computer-readable storage medium storing the program.

With the above arrangement according to the first aspect of the present invention, the license is updated even when the license becomes invalid while the user is performing an operation using the application, whereby it is possible for the user to continue the operation without restarting the application. Therefore, the user can undergo reduced risk in performing the operation, and userfriendliness can be enhanced.

Moreover, the license is updated by accessing an external device that issues the license using the access means when the license becomes invalid while the user is performing the operation using the application, whereby it is possible for the user to continue the operation without restarting the application. Therefore, userfriendliness can be further enhanced.

The above and other objects, features, and advantages of the invention will become more apparent from the following detailed description taken in conjunction with the accompanying drawings.

DETAILED DESCRIPTION OF THE PREFERRED EMBODIMENTS

The present invention will now be described in detail with reference to the drawings showing a preferred embodiment thereof.

Figure 1:
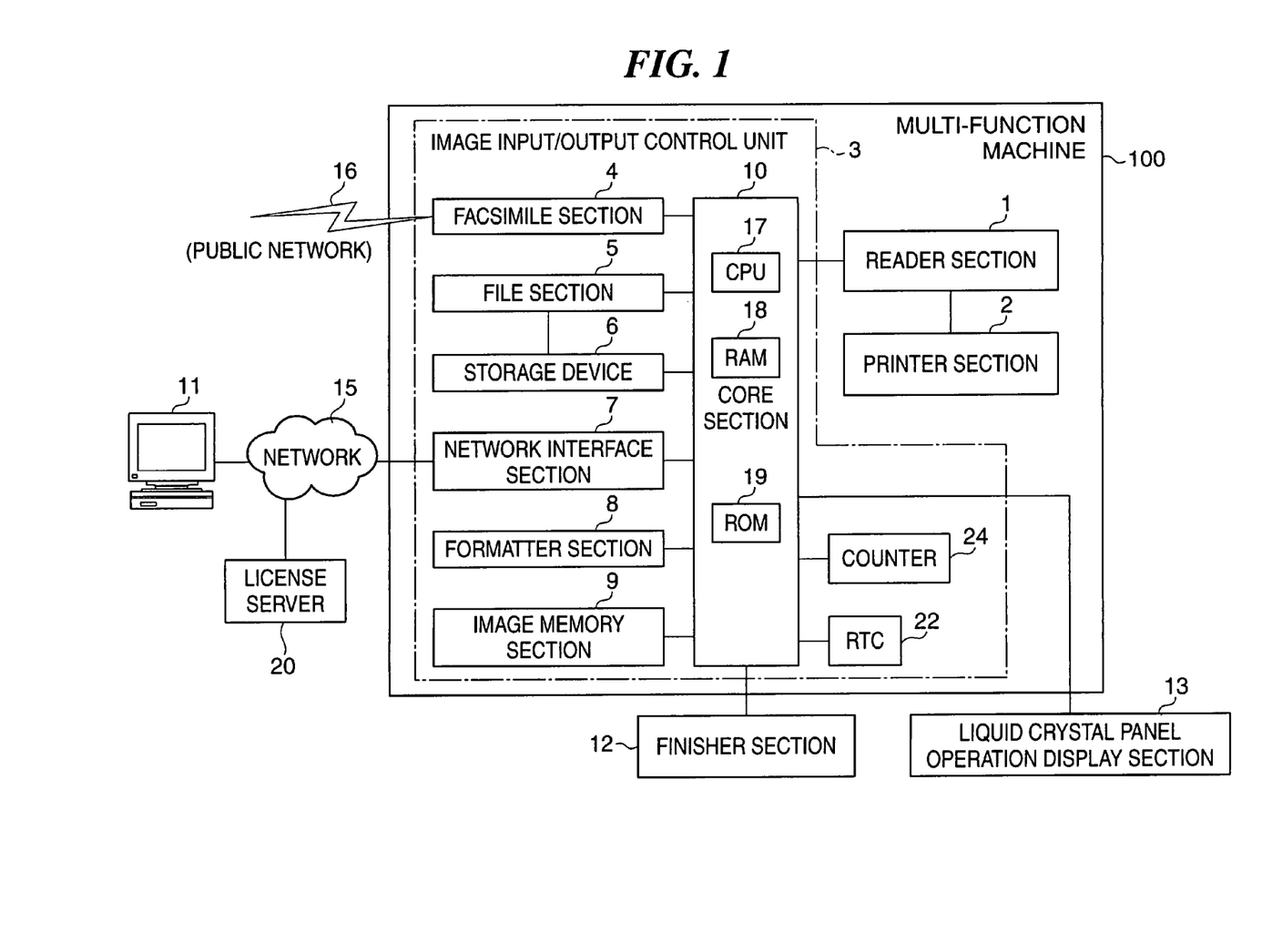
FIG. 1 is a block diagram showing the configuration of a multi-function machine as an image forming apparatus according to an embodiment of the present invention.

FIG. 1 is a block diagram showing the configuration of a multi-function machine as an image forming apparatus according to an embodiment of the present invention.

As shown in FIG. 1, the multi-function machine 100 as the image forming apparatus according to the present embodiment, is comprised of all functions of a scanner, a printer, a copy machine, and a facsimile. The multi-function machine 100 is connected to an external license server 20 and a client computer 11 via a network 15 such as the Internet, and is also connected to other communication apparatuses, not shown, via a public network 16.

The multi-function machine 100 is not limited to the example shown in FIG. 1, but it may be a digital copying machine, a printer with a copy function or the like, and the number of peripheral devices connected to the network 15 is not limited to the example shown in FIG. 1. The image forming apparatus according to the present embodiment is not limited to the multi-function machine 100, but may be a printing apparatus such as a facsimile machine and a printer, an apparatus with a single function (e.g. a scanner device or the like) capable of forming images, or a controller or the like included in each of the aforementioned devices.

The multi-function machine 100 is mainly comprised of a reader section 1, a printer section 2, and an image input/output control unit 3. The reader section 1 is connected to the printer section 2 and the image input/output control unit 3, and reads an image on an original document, and outputs image data obtained by the image reading to the printer section 2 or the image input/output control unit 3. The printer section 2 prints image data outputted from the reader section 1 and the image input/output control unit 3 on a recording sheet. The image input/output control unit 3 connects to the external network 15 and the public network 16 to perform input/output of the image data, and storage of information indicative of an amount of use of the multi-function machine 100 by the user, and further performs analysis and control of jobs (print command and the like) received from the client computer 11 connected to the network 15.

The image input/output control unit 3 is comprised of a facsimile section 4, a file section 5, a storage device 6, a network interface section 7, a PDL formatter section 8, an image memory section 9, a core section 10, a real time clock module (RTC) 22, and a counter 24. The core section 10 is comprised of a CPU 17, a RAM 18, and a ROM 19. The facsimile section 4 is connected to the core section 10 and the public network 16 to expand compressed image data received from the public network 16 and transmit the expanded image data to the core section 10. The facsimile section 4 also compresses image data transmitted from the core section 10 and transmits the compressed image data to the public network 16 via a public line. A finisher section 12 and a liquid crystal panel operation display section 13 are connected to the core section 10.

The file section 5 is connected to the core section 10 and the storage device 6 to compress the image data transmitted from the core section 10 and store the compressed image data with a key word for retrieving the compressed image data in the storage device 6. In the present embodiment, for example, a hard disk drive is used as the storage device 6, but the storage device is not limited to this. The file section 5 retrieves the compressed image data stored in the storage device 6 based on the key word transmitted from the core section 10, and reads the compressed image data and expands the same, and transmits the expanded image data to the core section 10. The storage device 6 is capable of storing not only image data but also application programs executed by the CPU 17, information such as the usage status of the user, the number of copied sheets, the number of printed sheets, and the number of scanned sheets, license information on applications, and the like.

The network interface section 7 is provides interface between the license server 20 and the client computer 11 which are connected thereto via the external network 15 and the core section 10. Transmission and reception of job control data and image data from the client computer 11 are performed via the network interface section 7.

Here, examples of the job control data include job control data which includes job control commands transmitted together with PDL data. For example, the job control commands are such commands that cause the PDL data to be loaded and printed as image data, and then cause sheets with the images formed thereon to be staple sorted and discharged.

The formatter section 8 is connected to the core section 10 to convert PDL data transmitted from the client computer 11 into image data capable of being printed by the printer section 2. The image memory section 9 temporarily stores image data read by the reader section 1 and image data transmitted from the client computer 11 and the like via the network interface section 7.

The core section 10 controls data and the like transmitted between the aforementioned reader section 1, facsimile section 4, file section 5, network inter face section 7 and formatter section 8. The core section 10 also analyzes job control data provides control such that information such as the usage status of the user, the number of sheets copied, the number of printed sheets, and the number of scanned sheets is stored in the RAM 18 or the storage device 6. The core section 10 also performs image processing such as zooming, rotation, resolution conversion, and format conversion on image data. The CPU 17 of the core section 10 provides various kinds of control of the entire image input/output control unit 3 by loading application programs stored in the ROM 19 or the storage device 6 into the RAM 18 and executing them. Further, the CPU 17 executes various kinds of software modules which constitute the features of the present embodiment in FIG. 2, described later.

The real time clock module (RTC) 22 manages time. The RTC 22 is also capable of accessing a NTP (Network Time Protocol) server, not shown, which is located outside the multi-function machine, via a network periodically or in optional timing as required, to obtain time information and correct the time to accurate time.

The counter 24 counts and stores the number of times of operation of the multi-function machine 100 (for example, the number of times of copying, the number of times of scan, the number of times of printing, the number of times of facsimile transmission, and the number of times of image processing). Although described in detail later, the counter 24 also counts the number of times of operation of the multi-function machine 100 through execution of an application, and posts the same to a license information database 209, so that the counted number of times of operation can be used for checking the expiration of the license of the application, described later.

The license server 20 is a Web server which issues licenses necessary to use various applications including an application (A) 204. The client computer 11 implemented by a personal computer or a workstation, has a Web browser installed therein, and is capable of accessing the multi-function machine 100 via the network 15.

Figure 2:
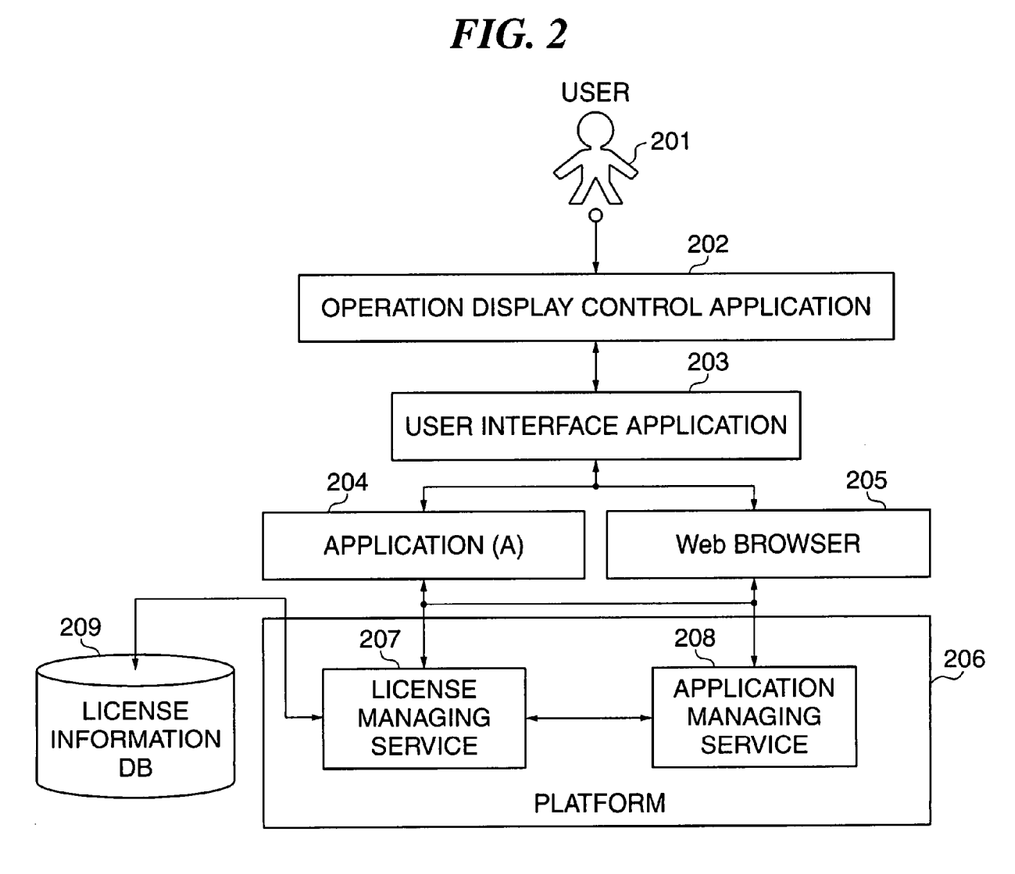
FIG. 2 is a block diagram showing an example of the software configuration of a multi-function machine appearing in FIG. 1.

FIG. 2 is a block diagram showing an example of the software configuration of the multi-function machine 100.

An operation display control application 202, a user interface application 203, the application (A) 204, a Web browser 205, a platform 206, and the license information database 209 are stored as software modules in the ROM 19 of the core section 10 or the storage device 6 of the multi-function machine 100 shown in FIG. 1.

The multi-function machine 100 is provided with the liquid crystal panel operation display section 13 as an interface between a user 201 and the multi-function machine 100. The operation display control application 202 controls the liquid crystal panel operation display section 13.

Further, the user interface application 203 provides interface between the operation display control application 202, and the application (A) 204 and the Web browser 205. The application (A) 204 is an example of the application of which the operation is managed by the license.

The platform 206 functions as an execution environment for one or more applications such as the application (A) 204, and is configured using, for example, a Java (registered trademark) virtual machine. An application managing service 208 which manages the operation of the application (A) 204, and a license managing service 207 which manages the license of the application (A) 204 are included in the platform 206. All the information contained in the license of the application (A) 204 is managed by the license information database 209. The license information database 209 is stored in the storage device 6 in FIG. 1.

In the present embodiment, the term of validity (the date and time are generally set) of the application, or the upper limit of the number of times of operation of the multi-function machine in accordance with the application (any of the operations of copying, scanning, printing, facsimile transmission, image processing, and the like, or a plurality of operations among these operations), and the current number of times of operation are set in the license information. The current number of times of operation can be set in the license information by obtaining a count value from the counter 24.

The license managing service 207 is operable at the start of the application or during the operation of the application, to check the license information concerning the application from the license information database 209, and check the real time clock module 22 as necessary, and determine whether the term of validity of the application has expired or whether the number of operations reaches the upper limit number of times of operation of the multi-function machine 100 in accordance with execution of the application has reached its upper limit, to thereby check whether the license has expired, namely, whether the license is valid or invalid.

The user interface application 203 has a communication function of communicating with the application (A) 204 and the Web browser 205, and is capable of presenting necessary information to the user 201 in response to a request from the application (A) 204 or the Web browser 205.

The application (A) 204 and the Web browser 205 each have a communication function of communicating with the application managing service 208 and the license managing service 207. The application managing service 208 is capable of utilizing this communication function to manage operations, such as installation, uninstallation, execution, and stop, of the application (A) 204 and the Web browser 205.

Here, in the present embodiment, installation and uninstallation of the application (A) 204 can be made by an operation of the computer 11 via the network 15, or by an operation through the liquid crystal panel operation display section 13.

The license managing service 207 is capable of using the aforesaid communication function to transmit and receive the license information to and from the application (A) 204, and notify the application (A) 204 of license update (a notification that the license has been updated), for example.

Further, the application managing service 208 and the license managing service 207 have a communication function of communicating with each other. This communication function is also used when the application managing service 208 refers to the license information in managing the operation of the application (A) 204, and when the license managing service 207 accesses the external Web server and executes the Web browser 205 to present a Web page.

The license managing service 207 has a function of communicating with the license information database 209, and is capable of performing operations such as creation, addition, correction, and deletion of the license information. Update of the license information in the license information database 209 can be performed via the license managing service 207 by an operation through the liquid crystal panel operation display section 13 or an operation of the computer 11 via the network 15.

The software configuration of the multi-function machine 100 is not limited to the above described software configuration insofar as the license update operation can be performed by the multi-function machine 100 and a suitable function of notifying that the license has been updated is provided, for the application (A) 204.

Next, the operation of the application according to the present embodiment will be described with reference to FIGS. 3A to 7.

Figure 3A:
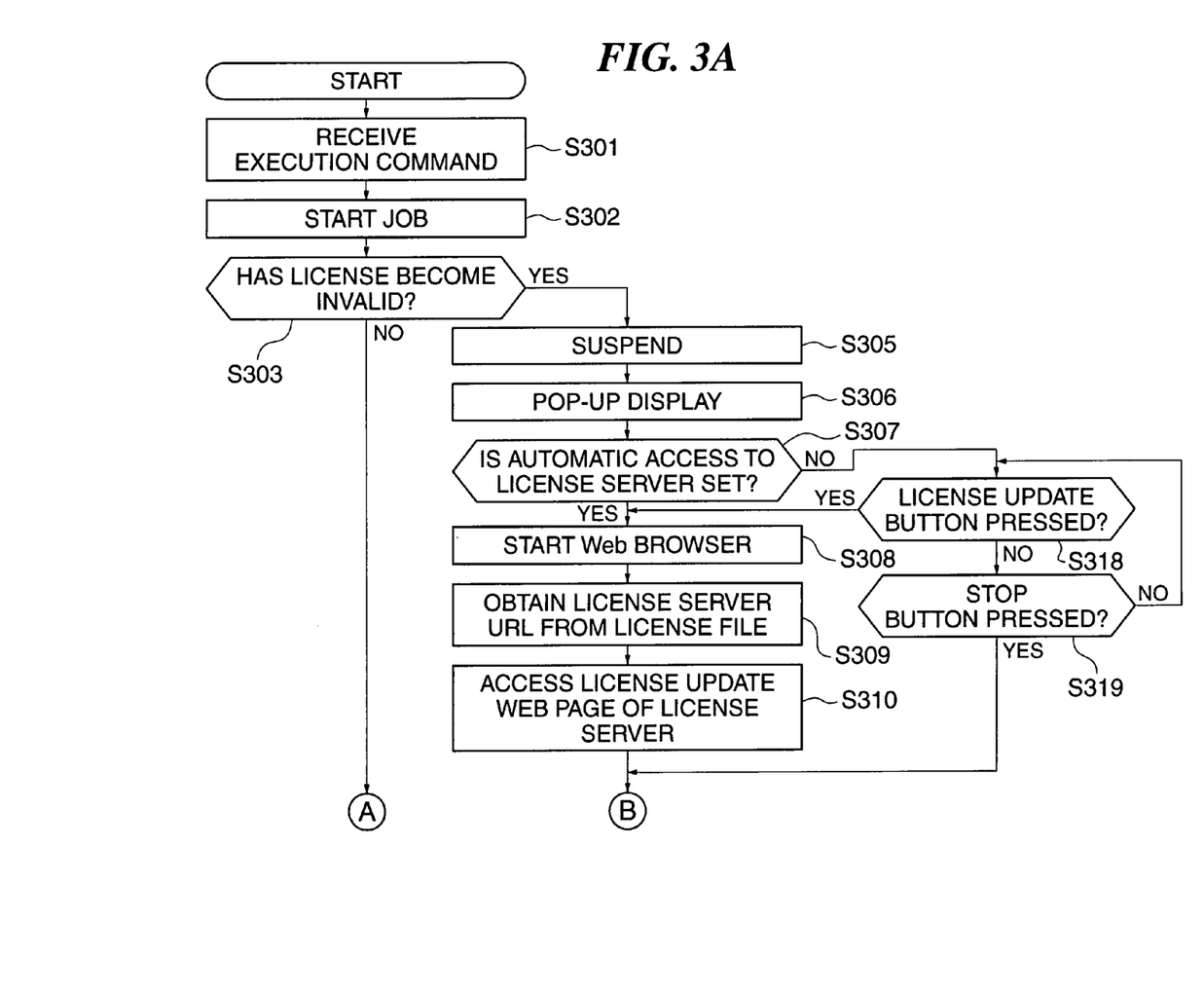
FIGS. 3A and 3B are flow charts showing the procedure of a process for processing a job executed based on an application by a core section appearing in FIG. 1.
Figure 3B:
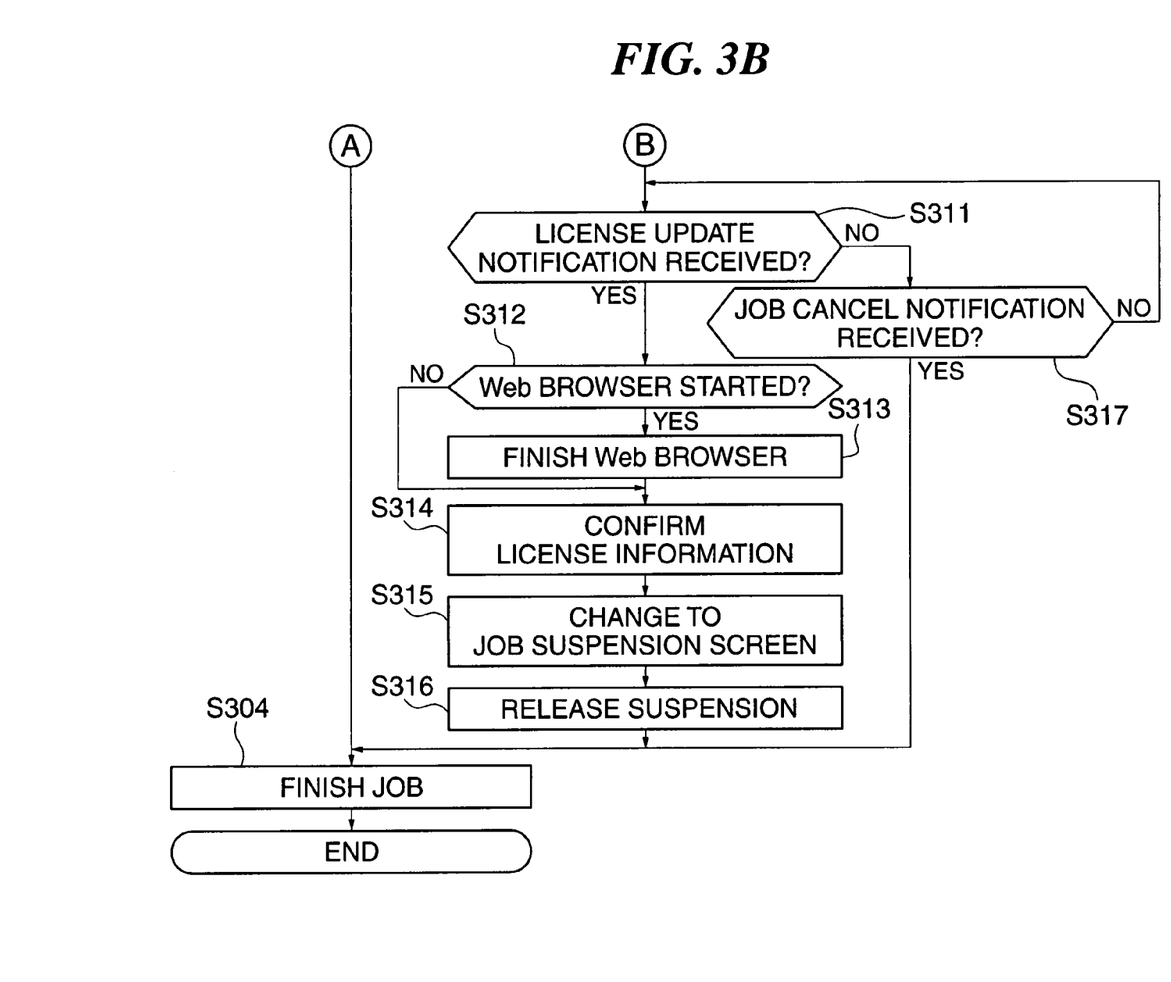
Figure 4:
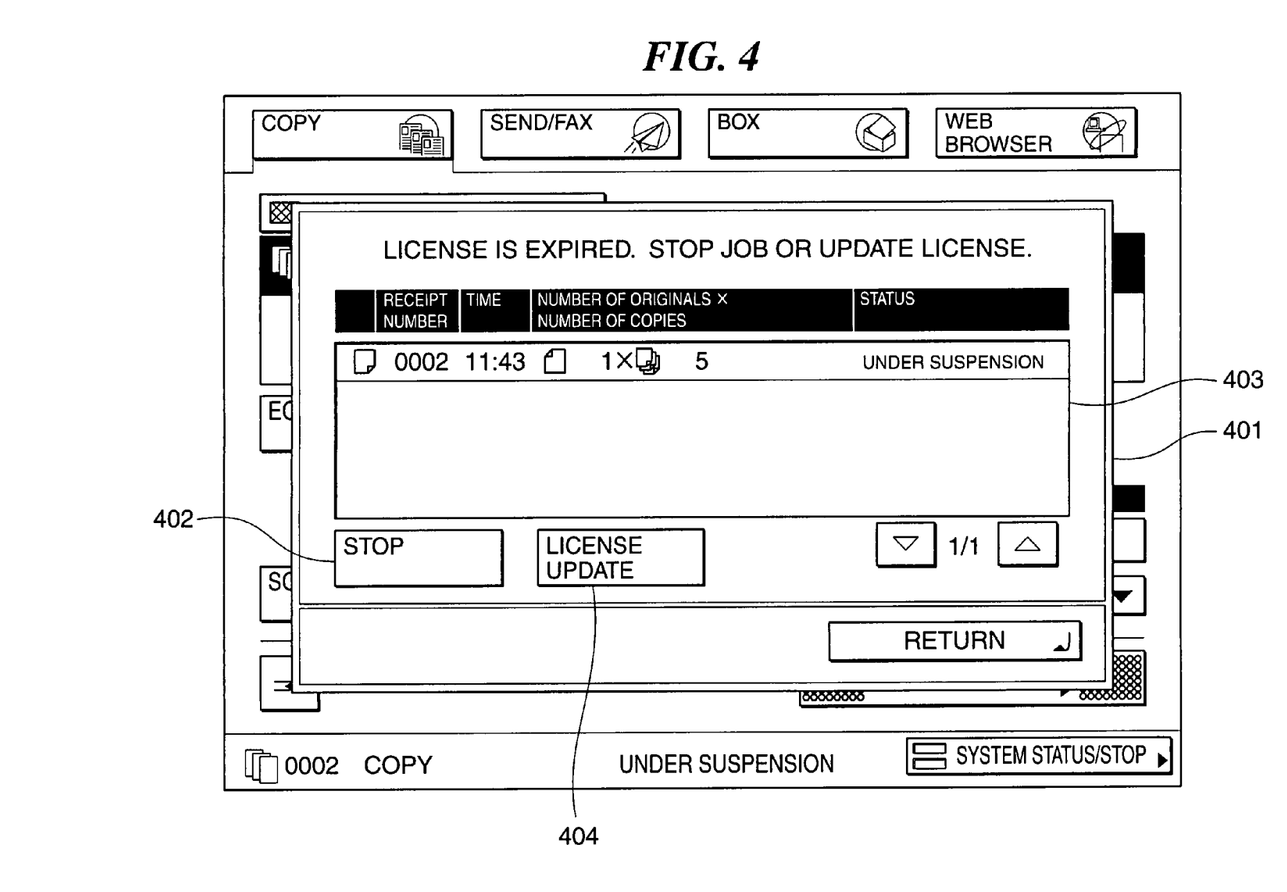
FIG. 4 is a view showing an example of a display screen displayed when execution of a job is suspended.
Figure 5:
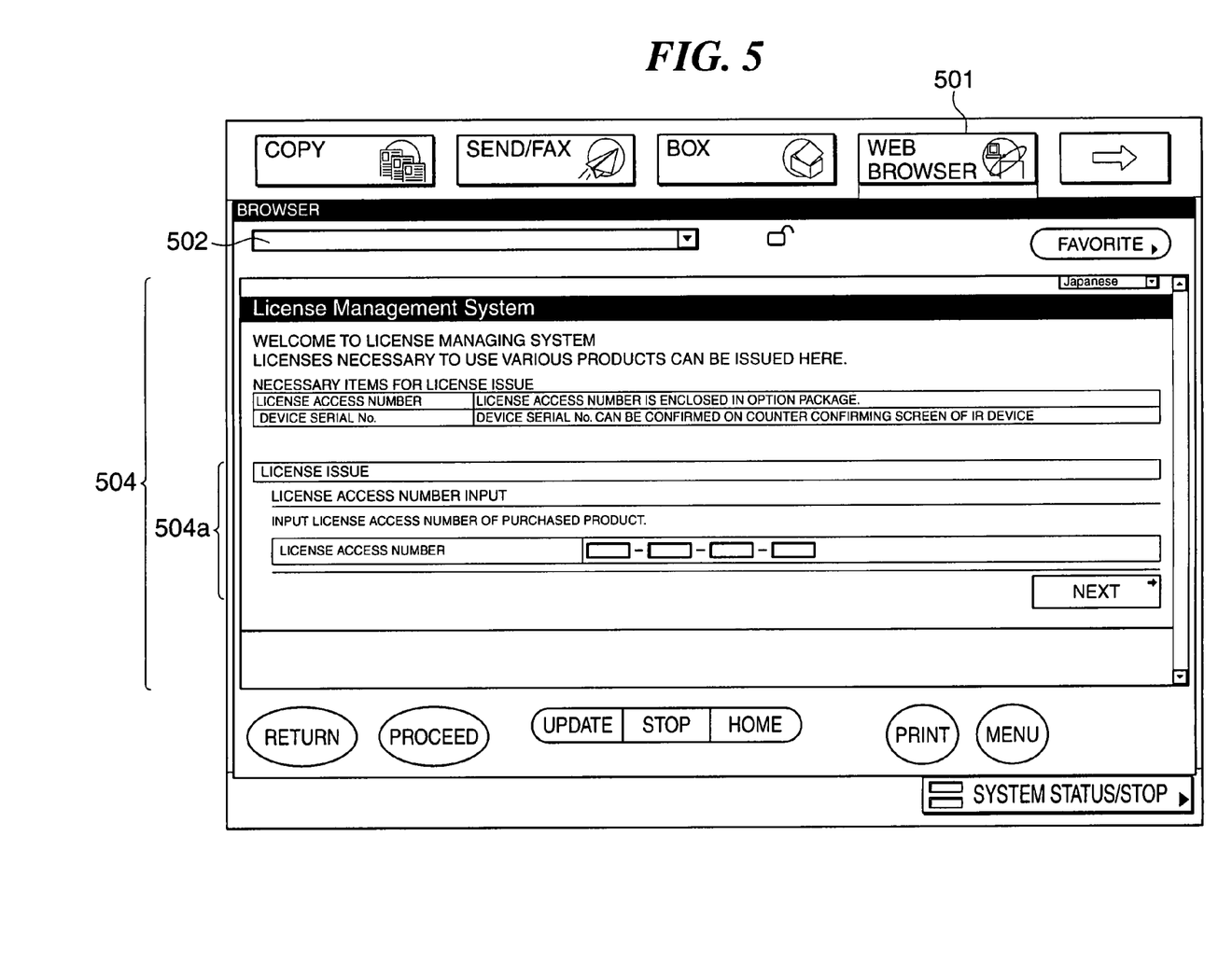
FIG. 5 is a view showing an example of a screen displayed when a license server is accessed by a Web browser.
Figure 6:
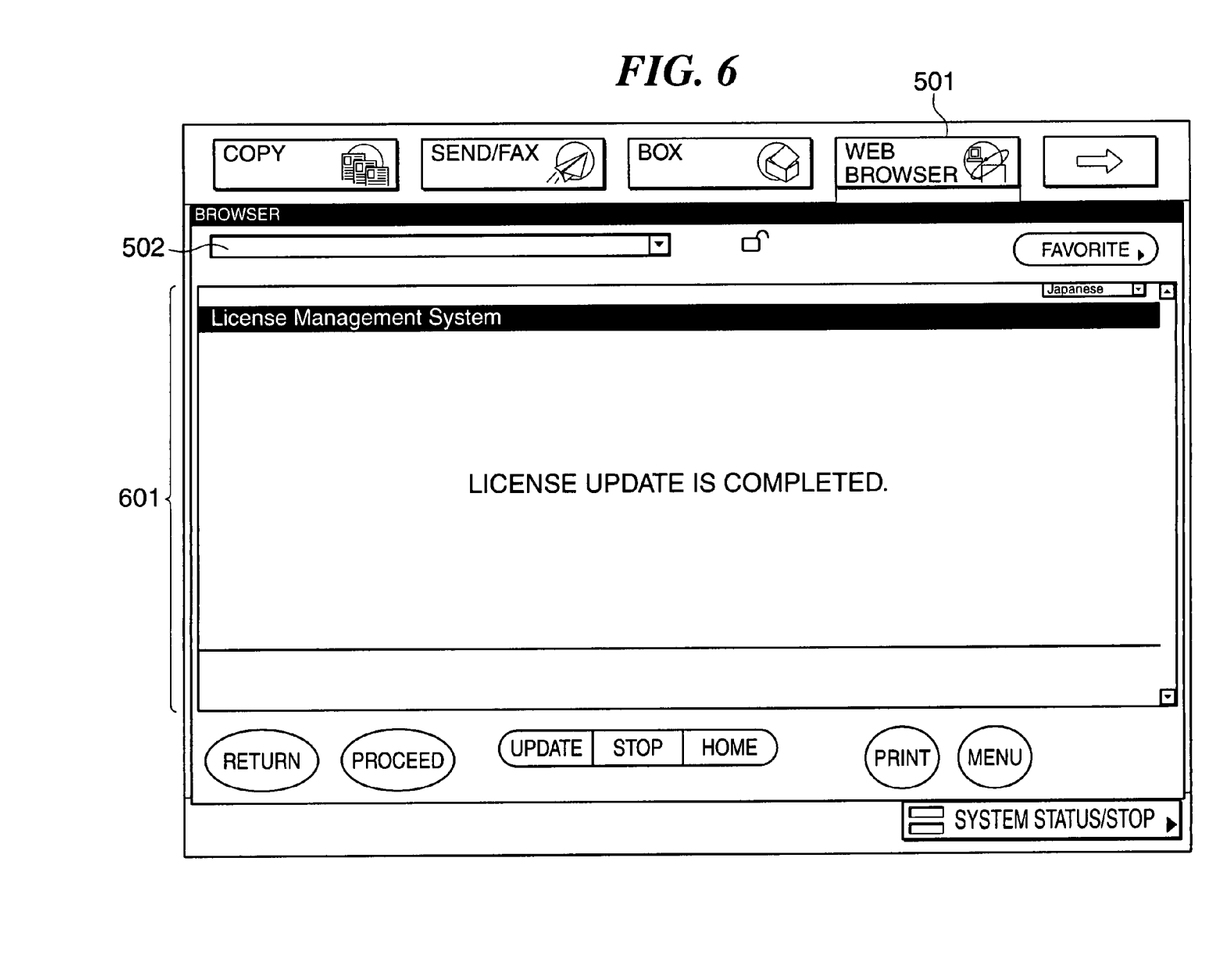
FIG. 6 is a view showing an example of a screen displayed when updating of a license by the Web browser is completed.
Figure 7:
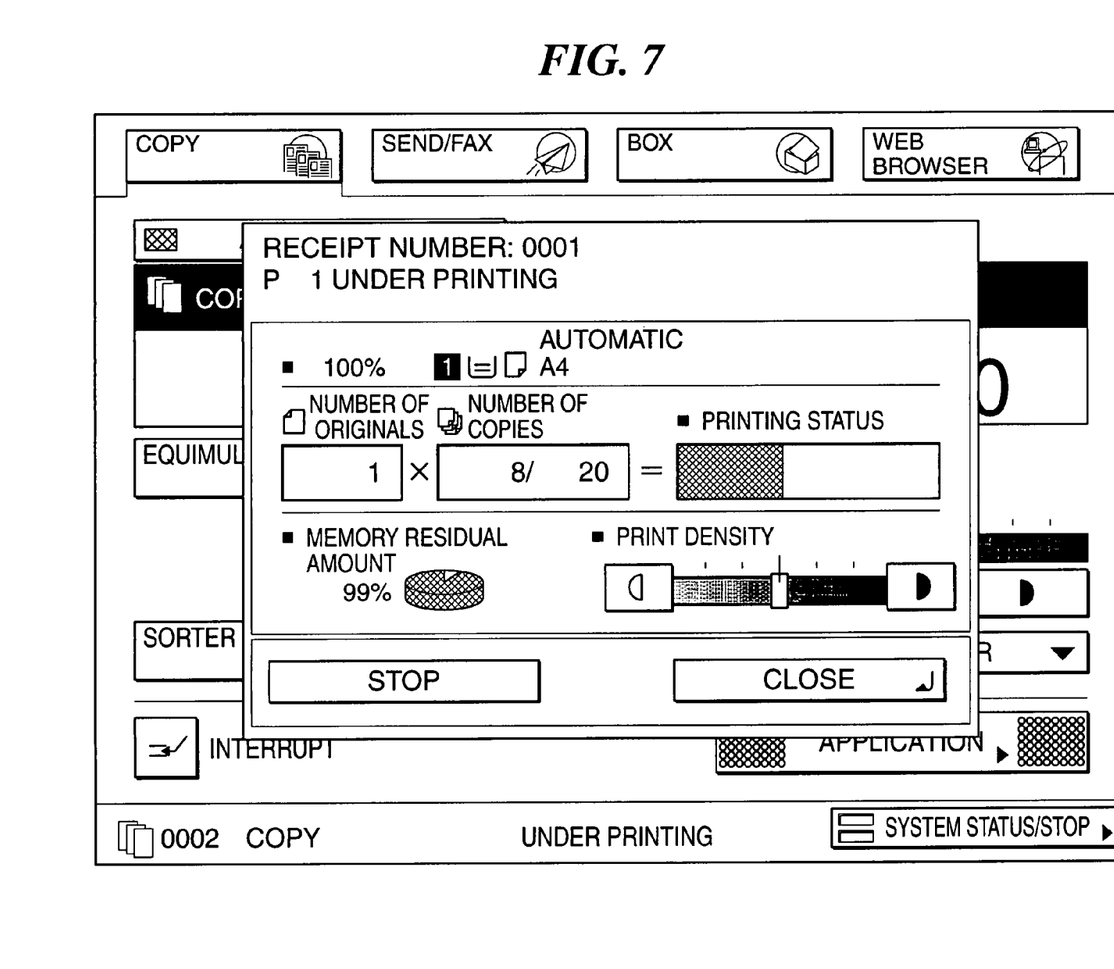
FIG. 7 is a view showing an example of a screen displayed when the suspension of the job has been released and the job is restarted.

FIGS. 3A and 3B are flow charts showing the procedure of a process for processing a job which is executed by the CPU 17 of the core section 10 based on the application (A) 204. FIG. 4 is a view showing an example of a display screen displayed when execution of a job is suspended, and FIG. 5 is a view showing an example of a screen displayed when the license server 20 is access by the Web browser 205. FIG. 6 is a view showing an example of a screen displayed when updating of a license by the Web browser 205 is completed, and FIG. 7 is a view showing an example of a screen displayed when the suspension of the job has been released and the job is restarted.

When, for example, the application (A) 204 which is displayed on the liquid crystal panel operation display section 13 is executed, the process shown in the flow charts of FIGS. 3A and 3B is started.

First, in a step S301, the application (A) 204 receives an execution command, whereby the process proceeds to s step S302, where the job of the application (A) 204 is started.

In a step S303, it is determined whether the license has become invalid or not during execution of the job, as a result that the license has expired or the number of times of use has reached the upper limit number. When the license has not become invalid during execution of the job, the process jumps to a step S304 where the job of the application (A) 204 is terminated normally.

Cases where the license expires during execution of the job include a case where the term of validity of the application expires while the multi-function machine 100 is operating the job in accordance with execution of the application, and a case where the number of times of execution of the job reaches the upper limit number of times of execution of the job permitted for the application while the multi-function machine 100 is operating in accordance with execution of the application.

When the license becomes invalid during execution of the job, the process proceeds to a step S305, where the license managing service 207 notifies the application (A) 204 that the license has become invalid. Responsive to the notification from the license managing service 207, the operation of the application (A) or the execution of the job of the multi-function machine 100 related to the application (A) is suspended, and the process proceeds to a step S306.

As another method of suspending the application (A), the license managing service 207 may notify the application managing service 208 that the license of the application (A) has become invalid, and the application managing service 208 may issue a command for suspension to the application (A).

In the step S306, as shown in the screen in FIG. 4, a pop-up 401 including a message "The license is expired", a job status screen list 403 showing the job suspended due to expiration of the license, and an instruction prompting the user to "stop the job or update the license" are displayed on the liquid crystal panel operation display section 13, and the process proceeds to a step S307. It is also possible to stop the job by the user pressing a stop button 402. A license update button 404 is displayed for starting the Web browser 205 to perform a license updating operation, and instructing the Web browser 205 to access the license server 20. When "AUTOMATIC ACCESS TO LICENSE SERVER" is set in the step S307, described later, the license update button 404 is not displayed.

In the step S307, the license managing service 207 confirms the license information of the application (A) 204 to determine whether or not setting to automatic access to the license server 20 has been made. When the automatic access has been set, the process proceeds to a step S308, where the Web browser 205 is started via the application managing service 208, and the process proceeds to a step S309.

On the other hand, when the setting to automatic access to the license server has not been set in the step 307, the process proceeds to a step S318, where it is determined whether or not the license update button 404 has been pressed. When the license update button 404 has been pressed, the process proceeds to the step S308. When the license update button has not been pressed in the step S318, the process proceeds to a step S319, where it is determined whether or not the stop button 402 has been pressed. When the stop button 402 has been pressed in the step S319, the process proceeds to a step S311, and when the stop button 402 has not been pressed, the process returns to the step S318 again.

In the step S309, a URL (Uniform Resource Locator) of the license server 20 is obtained from information described in a license file of the application (A) 204, and in the next step S310, the Web browser 205 accesses a page for updating the license on the license server 20.

When the Web browser 205 accesses the page for updating the license, a Web page 504 of the license server 20 is displayed on the liquid crystal panel operation display section 13, as shown in the screen of FIG. 5, for example. Specifically, the page 504 of the Web browser 501 on the screen displayed on the liquid crystal panel operation display section 13 is provided with an input region 504a for issuing a license for an application product to be used. The user inputs a license access number allotted to the application (A) 204 in this input region 504a, whereby the license for the application (A) 204 is issued. A display region 502 displays the URL of the Web page which the Web browser has accessed.

When the setting to automatic access to the license server 20 has not been made, the process proceeds to a step S311, where manual updating of the license by the user is waited with the screen remaining in the display state in FIG. 4. Here, as another method for manually updating the license by the user, the user manually accesses the license server 20 from the Web browser of the client computer 11 to obtain the license and update the license in the multi-function machine 100.

When the user 201 recognizes the information to urge the license update displayed on the screen in FIG. 4, and performs the operation to update the license (automatic update using the screen in FIG. 5, update by pressing down the license update button in the screen in FIG. 4, or manual update by the client computer 11 with the screen remaining as in FIG. 4), a message indicating that the update of the license is finished is displayed as shown in a license update completion display page 601 in FIG. 6. Then, the license information is downloaded into the multi-function machine 100 from the license server 20, so that the license information in the license information database 209 is updated through the license managing service 207. The license managing service 207 sends a license update notification that the license has been updated to the application (A) 204 after updating the license information.

During the suspension of the application (A) 204, the process proceeds to a step S311, and a license update notification from the license managing service 207 is awaited. When the job is cancelled by the user 201 in this state (YES to a step S317), the process proceeds to the step S304 from the step S317, where the execution of the job is terminated.

On the other hand, when the application (A) 204 receives the license update notification in the step S311, the process proceeds to a step S312, where it is determined whether or not the Web browser 205 has been started. When the Web browser 205 has not been started, the process skips a step S313 over to a step S314. When the Web browser 205 has been started, the process proceeds to the step S313 to terminate the Web browser 205, and then the process proceeds to the step S314.

In the step S314, information necessary for making the license valid, which is written in, for example, the license update notification is confirmed. Then, in a step S315, the display screen is changed to the screen of suspension of the job (FIG. 4) because the license information has been confirmed. Then, the process proceeds to a step S316, where the suspension of the job execution is released by the application managing service 208, whereby the remaining processing of the job is restarted as shown in the screen example at the time of release of the suspension of the job (FIG. 7). After all the processing of the job is completed, the process proceeds to the step S304 to finish the job.

According to the present embodiment, the platform which has the function of notifying that the license has been updated is provided, and accordingly the application is capable of confirming the license information when receiving the license update notification. Therefore, when the license becomes expired while the user is performing an operation using the application (when the license becomes expired during copying, for example), the restarting operation of the application can be avoided more efficiently than in the method in which the application itself periodically monitors the license information. Further, when the license becomes expired during use of the application, it is possible to automatically access the license server 20 using the Web browser 205, and therefore the user can easily update the license.

As a result, it is possible to continue the operation without restarting the application, and the frequency of restarting the application can be decreased, therefore, making it possible for the user to undergo reduced risk in performing the operation, and enhancing the userfriendliness.

The above described embodiment is merely one example of embodiment of the present invention in which the present invention is implemented, and the technical scope of the present invention should not be considered to be limited by the embodiment. More specifically, the present invention can be implemented in various forms without departing from its main features.

The present invention is not limited to the apparatus of the above described embodiment, and the present invention may be applied to a system comprised of a plurality of apparatuses, or may be applied to an apparatus comprised of a single device.

It is to be understood that the object of the present invention may also accomplished by supplying a system or an apparatus with a storage medium in which a program code of software which realizes the functions of the above described embodiment is stored, and causing a computer (or CPU or MPU) of the system or apparatus to read out and execute the program code stored in the storage medium.

In this case, the program code itself read from the storage medium realizes the functions of the above described embodiment, and hence the program code and a storage medium in which the program code is stored constitute the present invention.

Examples of the storage medium for supplying the program code include a floppy (registered trademark) disk, a hard disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program code may be downloaded via a network.

Further, it is to be understood that the functions of the above described embodiment may be accomplished not only by executing the program code read out by a computer, but also by causing an OS (Operating System) or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

CROSS REFERENCE TO RELATED APPLICATION

This application claims priority from Japanese Patent Applications Nos. 2004-182448 filed Jun. 21, 2004, 2605-031956 filed Feb. 8, 2005, and 2005-169585 filed Jun. 9, 2005, which is hereby incorporated by reference herein.

What is claimed is:

1. An image forming apparatus comprising:
a storage device that stores an application program and license information relating to a license for the stored application program;
an image forming job-performing device that executes the stored application program to execute an image forming job relating to an image input or output;
a license managing device that manages the stored license information in association with the stored application program; and
a notifying device that issues a notification notifying the application program of invalidity of the license when said license managing device determines that the license for the application program has become invalid during execution of the image forming job,
wherein the image forming job-performing device suspends the execution of the application program in response to the notification from said notifying device, and also suspends the execution of the image forming job associated with the execution-suspended application program,
wherein the image forming job-performing device executes remaining processing of the image forming job when execution of the suspended image forming job is restarted in accordance with updating of the license information,
wherein the image forming apparatus further comprises a scanner that reads an image on an original document, and a printer that prints the read image on a sheet,
wherein the image forming job-performing device executes the stored application program to execute the image forming job, the image forming job including a sheet reading operation by the scanner or printing operation by the printer,
wherein the image forming job-performing device suspends the execution of the application program in response to the notification from said notifying device, and also suspends the execution of the image forming job, including suspending the sheet reading operation by the scanner or the printing operation by the printer, associated with the execution-suspended application program, and
wherein the image forming job-performing device executes remaining processing of the image forming job, including executing remaining sheet reading by the scanner or remaining printing operation by the printer, when execution of the suspended image forming job is restarted in accordance with updating of the license information.

2. An image forming apparatus as claimed in claim 1, further comprising an application program managing device that instructs a license obtaining application program for accessing an external license managing device to start in response to said license managing device detecting that the license of the application program has become invalid during the execution of the image forming job.

3. An image forming apparatus as claimed in claim 2, wherein:
said license managing device updates the license information stored in said storage device in response to the license obtaining application program obtaining an updated license from the license managing device, and
said notifying device notifies the application program that the license information has been updated.

4. An image forming apparatus as claimed in claim 3, wherein the suspended execution of the application program is restarted in response to the notification that the license information has been updated from said notifying device.

5. An image forming apparatus as claimed in claim 1, further comprising a user interface that displays an operation screen of the image forming apparatus and accepts operation inputs from a user,
wherein said user interface displays a message indicating that the application program is suspended in response to the notification from said notifying device.

6. An image forming apparatus as claimed in claim 5, wherein said user interface displays a massage urging update of the license of the application program.

7. An image forming apparatus as claimed in claim 5, wherein said user interface instructs start of a license obtaining application program for accessing an external license managing device in response to acceptance of a key input for license update.

8. An image forming apparatus as claimed in claim 5, wherein:
said user interface notifies said license managing device of updated license information in response to acceptance of an input of license update information, and said license managing device obtains the updated license information notified by said user interface to thereby update the license information stored in said storage device.

9. An image forming apparatus as claimed in claim 1, further comprising:
a user interface that displays an operation screen of the image forming apparatus and accepts operation inputs from a user; and
a set value storage device that stores in said storage device a setting as to whether to automatically start a license obtaining application program for accessing an external license managing device when the license of the application program has become invalid,
wherein said user interface is responsive to the suspension of the execution of the application program, for instructing start of the license obtaining application program when the stored setting is to start the license obtaining application program, and for displaying a message urging update of the license when the stored setting is not to start the license obtaining application program.

10. An image forming apparatus as claimed in claim 1, wherein the license information includes information relating to a term of validity of the application program.

11. An image forming apparatus as claimed in claim 1, wherein the license information includes an upper limit value of a number of times of operation of the image forming apparatus associated with the application program, the image forming apparatus operating in accordance with execution of the application program.

12. A license managing method for an application executed by an image forming apparatus having a storage device that stores an application program and license information relating to a license for the stored application program, the method comprising:
an image forming job-performing step of executing the stored application program to execute an image forming job relating to an image input or output;
a license managing step of managing the stored license information in association with the application program; and
a notifying step of issuing a notification notifying the application program of invalidity of the license when said license managing step determines that the license of the application program has become invalid during execution of the image forming job,
wherein said image forming job-performing step suspends the execution of the application program in response to the notification in said notifying step, and also suspends the execution of the image forming job associated with the execution-suspended application program,
wherein the image forming job-performing step executes remaining processing of the image forming job when execution of the suspended image forming job is restarted in accordance with updating of the license information,
wherein the license managing method further comprises a scanning step of reading, with a scanner, an image on an original document, and a printing step of printing, with a printer, the read image on a sheet,
wherein the image forming job-performing step executes the stored application program to execute the image forming job, the image forming job including a sheet reading operation by the scanner or printing operation by the printer,
wherein the image forming job-performing step suspends the execution of the application program in response to the notification from said notifying step, and also suspends the execution of the image forming job, including suspending the sheet reading operation by the scanner or the printing operation by the printer, associated with the execution-suspended application program, and
wherein the image forming job-performing step executes remaining processing of the image forming job, including executing remaining sheet reading by the scanner or remaining printing operation by the printer, when execution of the suspended image forming job is restarted in accordance with updating of the license information.

13. A non-transitory computer-readable medium storing a computer program for implementing a license management in an image forming apparatus having a storage device that stores an application program and license information relating to a license for the stored application program, the computer program comprising:
an image forming job-performing module for executing the stored application program to execute an image forming job relating to an image input or output;
a license managing module for managing the stored license information in association with the application program; and
a notifying module for issuing a notification notifying the application program of invalidity of the license when said license managing module determines that the license of the application program has become invalid during execution of the image forming job,
wherein said image forming job-performing module suspends the execution of the application program in response to the notification from said notifying module, and also suspends the execution of the image forming job associated with the execution-suspended application program,
wherein the image forming job-performing module executes remaining processing of the image forming job when execution of the suspended image forming job is restarted in accordance with updating of the license information,
wherein the computer program further comprises a scanning module for reading an image on an original document with a scanner, and a printing module for printing the read image on a sheet with a printer,
wherein the image forming job-performing module executes the stored application program to execute the image forming job, the image forming job including a sheet reading operation by the scanner or printing operation by the printer,
wherein the image forming job-performing module suspends the execution of the application program in response to the notification from said notifying module, and also suspends the execution of the image forming job, including suspending the sheet reading operation by the scanner or the printing operation by the printer, associated with the execution-suspended application program, and
wherein the image forming job-performing module executes remaining processing of the image forming job, including executing remaining sheet reading by the scanner or remaining printing operation by the printer, when execution of the suspended image forming job is restarted in accordance with updating of the license information.

* * * * *